United States Patent
Bardet et al.

(10) Patent No.: US 12,467,939 B2
(45) Date of Patent: Nov. 11, 2025

(54) OPTICAL PROBE FOR MEASURING WALL-SHEAR STRESS

(71) Applicant: The George Washington University, Washington, DC (US)

(72) Inventors: Philippe M. Bardet, Washington, DC (US); Peter D. Huck, Washington, DC (US); Charles Fort, Washington, DC (US)

(73) Assignee: The George Washington University, Washington, DC (US)

(*) Notice: Subject to any disclaimer, the term of this patent is extended or adjusted under 35 U.S.C. 154(b) by 132 days.

(21) Appl. No.: 18/222,845

(22) Filed: Jul. 17, 2023

(65) Prior Publication Data

US 2024/0019458 A1 Jan. 18, 2024

Related U.S. Application Data

(60) Provisional application No. 63/389,654, filed on Jul. 15, 2022.

(51) Int. Cl.
*G01P 5/00* (2006.01)

(52) U.S. Cl.
CPC .................................. *G01P 5/001* (2013.01)

(58) Field of Classification Search
CPC ... G01P 5/001; G01P 5/26; G01F 1/74; G01F 15/063; G01F 15/066; G01F 1/661; G01F 1/7086; G01F 1/712
USPC .......................................................... 356/27
See application file for complete search history.

(56) References Cited

U.S. PATENT DOCUMENTS

| | | | |
|---|---|---|---|
| 7,738,695 B2 | 6/2010 | Shorte et al. | |
| 8,358,462 B2 | 1/2013 | Jacobsen et al. | |
| 9,195,043 B2 | 11/2015 | Ghosh et al. | |
| 9,678,323 B2 | 6/2017 | Orth et al. | |
| 9,952,422 B2 | 4/2018 | Vaziri et al. | |
| 10,317,667 B2 | 6/2019 | Waller et al. | |
| 11,022,731 B2 | 6/2021 | Waller et al. | |
| 11,199,691 B2 | 12/2021 | Vaziri et al. | |
| 11,567,308 B2 | 1/2023 | D'Angelo et al. | |
| 11,971,535 B2 | 4/2024 | Gopinath et al. | |
| 2011/0292505 A1* | 12/2011 | Kurtz | G02B 13/16 359/489.14 |
| 2013/0107357 A1* | 5/2013 | Silverstein | G02B 17/008 359/364 |
| 2013/0107360 A1* | 5/2013 | Kurtz | G02B 5/3083 359/708 |

(Continued)

FOREIGN PATENT DOCUMENTS

WO 2021/155330 A9 8/2021

*Primary Examiner* — Isiaka O Akanbi
(74) *Attorney, Agent, or Firm* — BLANK ROME LLP (57) ABSTRACT

Aspects of this disclosure are directed to optical probes for collecting images of a region of interest for determining wall shear stress. The optical probe includes an imager with a line of sight and a light guide configured to steer light from a light source to the region of interest. The optical probe includes an objective configured to focus light reflected off of the region of interest to the line of sight of the imager. The optical probe can include a micro-lens array at the objective. The micro-lens array can focus light from the objective onto the imager. The imager can collect images from the light from the micro-lens array for determining wall shear stress at the region of interest.

7 Claims, 7 Drawing Sheets

(56) References Cited

U.S. PATENT DOCUMENTS

| | | | |
|---|---|---|---|
| 2014/0146159 A1* | 5/2014 | Liu | G02B 21/006 |
| | | | 430/8 |
| 2014/0353522 A1* | 12/2014 | Wu | G01N 15/1434 |
| | | | 250/458.1 |
| 2015/0122977 A1* | 5/2015 | Halvorsen | G01N 15/1436 |
| | | | 250/214.1 |
| 2018/0188173 A1* | 7/2018 | Scarcelli | G01N 15/1429 |
| 2020/0132528 A1* | 4/2020 | Wang | G01F 1/206 |
| 2021/0055640 A1* | 2/2021 | Miyashita | H04N 9/3141 |
| 2021/0251491 A1* | 8/2021 | Zharov | G01N 15/1023 |

* cited by examiner

OPTICAL PROBE FOR MEASURING WALL-SHEAR STRESS

RELATED APPLICATION

This application claims the benefit of priority of U.S. Provisional Application No. 63/389,654, filed on Jul. 15, 2022, the entire content of which is relied upon and incorporated herein by reference in its entirety.

GOVERNMENT LICENSE RIGHTS

This invention was made with government support under grant no. DE-NA0003180 awarded by U.S. Department of Energy and grant no.-N00014-20-1-2672 awarded by the U.S. Office of Naval Research. The government has certain rights in the invention.

TECHNICAL FIELD

This disclosure is generally directed to the field of optical probes, and more particularly to optical probes for measuring shear stress at a fluid/wall interface.

BACKGROUND

Velocity profiles of a fluid flowing near a wall directly impact shear stress between the fluid and the wall, separation of the fluid flow from the wall, and the fluid flow regime (i.e., laminar, turbulent, or transitional). Each of these effects can have strong performance and control implications for a variety of engineering systems including, for example, aircraft, ships, piping networks, among other systems.

Wall shear stress ($\tau_w$) can be directly related to the wall normal (y-direction) gradient of streamwise fluid velocity (u) at the wall (y=0). For Newtonian fluids, the constant of proportionality is the dynamic viscosity $\mu$. The wall shear stress ($\tau_w$) for Newtonian fluids can thus be represented as in equation (1) below.

$$\tau_w = \mu \frac{\partial u}{\partial x}\Big|_{y=0} \quad (1)$$

Accurate measurement of wall shear stress can improve performance and control of the variety of engineering systems discussed previously. For laminar fluid flows, the length scale of a region of interest (i.e., a fluid/wall interface) can be on the order of 1-10 mm and the time scale of interest can be on the order of 10 ms. For turbulent fluid flows, it can be desirable for the fluid velocity gradients to be resolved at resolutions greater than or equal to the viscous wall unit, $l_v$. The viscous wall unit $l_v$ can be on the order of 2-20 μm with associated time-scales on the order of 10 μs. In transitional fluid flows (i.e., fluid flows between laminar and turbulent flows), it can be desirable for the spatial and temporal scales to be at least less than what is typical for the spatial and temporal scales for laminar flows.

SUMMARY

The inventors recognized that existing probes that measure wall shear stress do not measure the wall shear stress at the length and time scales necessary for accurately characterizing the full spectrum of fluid flow regimes. For example, many existing probes are larger than the viscous wall unit for turbulent flows, which can lead to significant spatial averaging of the wall shear stress and can compromise the accuracy of the measurement of turbulent fluid flows. The inventors also recognized that the bandwidth of existing probes is often limited. For example, since the wall shear stress for laminar fluid flow is typically small, the accuracy of existing probes is limited. Dedicated probes for particular flow regimes (i.e., laminar, turbulent, transitional) can help, but such dedicated probes can suffer from resolution issues.

The inventors recognized that there exists a need for an optical probe for measuring wall shear stress at length and time scales that allow for accurate characterization of the full spectrum of fluid flow regimes. The inventors also recognized that there exists a need for the optical probe to be compact and for the optical probe to resolve velocity and velocity gradients directly at the wall with resolution adequate for measuring wall shear stress with high accuracy. The inventors further recognized that the accuracy of the wall shear stress measurements can be reported based on a turbulent flow approximation, but the technique can be applicable to any flow regimes including laminar and transitional flow regimes.

These needs are met, to a great extent, by an optical probe for collecting images of a region of interest for determining wall shear stress. The optical probe includes an imager with a line of sight and a light guide configured to steer light from a light source to the region of interest. The optical probe also includes an objective configured to focus light reflected off of the region of interest to the line of sight of the imager and a micro-lens array at the objective. The micro-lens array is configured to focus light from the objective onto the imager. The imager is configured collect images from the light from the micro-lens array for determining wall shear stress at the region of interest.

Implementations may include one or more of the following features. The optical probe may include the light source. The optical probe may include a light guide that guides light from the light source to the region of interest. The light guide is configured to reflect light from the light source and direct the light to the region of interest without reflecting light of a wavelength from the region of interest. The light guide may include at least one of a dichroic mirror, a semi-reflective mirror, or a polarizing beam splitter. The light guide is configured to direct light from the light source towards the region of interest coaxially with an optical axis of the objective. The light guide is configured to direct light from the light source towards the region of interest at an angle with respect to an optical axis of the objective. The optical probe may include an optical insert with a geometry that corresponds to a geometry of a wall at the region of interest. The optical probe is configured to be recessed within a wall such that no portion of the optical probe projects into the region of interest. The optical probe is configured to be mounted within the wall by a mounting system that is configured to form a fluid-tight seal with the wall.

Another general aspect is a system for measuring wall shear stress within a region of interest. The system includes an optical probe for collecting images of the region of interest. The optical probe may include: an imager with a line of sight; a light guide configured to steer light from a light source to the region of interest; and an objective configured to focus light reflected off of the region of interest to the line of sight of the imager. The imager is configured to collect images from the light from the objective. The system also includes a processor configured to determine wall shear stress at the region of interest from the images.

Implementations may include one or more of the following features. The system where the optical probe further may include a micro-lens array at the objective. The micro-lens array is configured to focus light from the objective onto the imager. The micro-lens array is configured to subsample the region of interest at different perspective angles, and the processor is configured to generate a three-dimensional image from the subsample. The processor is configured to resolve near-wall velocity gradients at the region of interest. The processor is configured to determine wall shear stress at the region of interest from the images using molecular tagging velocimetry. The processor is configured to determine wall shear stress at the region of interest from the images using particle image velocimetry or particle tracking velocimetry. The system may include tracers injected into fluid flowing through the region of interest. The processor is configured to infer the wall shear stress from sparse velocity fields within the image. The processor is configured to resolve near-wall flow motion at desired spatio-temporal resolution.

Various additional features and advantages of this invention will become apparent to those of ordinary skill in the art upon review of the following detailed description of the illustrative embodiments taken in conjunction with the accompanying drawings.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Aspects of this invention are directed to optical probes for measuring shear stress at a fluid/wall interface. The term "wall" as used herein can include any surface over which a fluid may flow. Thus, in certain embodiments, the fluid is in direct contact with the wall. The wall may have special surface treatments, such as a film, texturing. The wall of this disclosure can correspond to a wall of engineering systems including, for example, aircraft, ships, piping networks, among other systems. The probe can include an imager that can resolve near-wall velocity gradients of fluid flow and extract the wall shear stress from the near-wall velocity gradients. The near-wall region changes with flow regimes (laminar, transitional, or turbulent) and fluids used; the range of values has been reported above. The imager can include an objective. The objective can have extended depth resolution to resolve optically clear domain volumetrically. For a particular flow domain, the objective can 1) achieve diffraction-limited lateral resolution comparable to, or better than, the viscous scales of the flow governing the wall shear stress, and 2) can achieve adequate resolution in the wall normal direction to resolve the velocity gradients that directly correspond to the wall shear stress. The objective can include a micro lens array, or the micro lens array can be a separate structure of the optical probe. The micro lens array can subsample the object at different perspective angles to capture a series of perspective images of a region of interest at the fluid/wall interface. The region of interest can be reconstructed computationally to create a full light field. Complex three-dimensional images can be constructed from the lightfield.

The optical probe can include one or more light sources that can illuminate a region of interest at the fluid/wall interface. In embodiments, the light source can be projected into the region of interest coaxial with the optical probe. In embodiments, the light source can be passed through the objective to illuminate the region of interest. In embodiments, the light source can project light into the region of interest at an angle relative to the optical axis of the optical probe, in a ring configuration, parallel to the wall, among other possibilities. In embodiments, the light source can be integrated within the optical probe using for example laser diodes, LEDs, among other possibilities. Alternatively, the light source can be distinct from the optical probe. For example, the light source can produce light externally from the optical probe and can supply the light to the region of interest using, for example, fiber optic cables.

The optical probe can be compact. In embodiments, the optical probe can include only a single imager though any number of imagers are possible. The optical probe can include an optical insert. The optical insert can allow the optical probe to be conformal to the wall of the fluid/wall interface that is probed. The optical insert can include a single component or several components. In embodiments in which the optical insert includes several components, some of the components can be structural and other components can perform curvature and/or refractive index correction.

The optical probe can be sufficiently compact to be installed within a surface at the region of interest. For example, the optical probe can be recessed into the wall of the fluid/wall interface such that the optical insert of the optical probe is flush with the surface of the wall that forms the fluid/wall interface, and so that no portion of the optical probe projects into the region of interest 120 so that it does not interfere with the flow of the element. According to this configuration, the optical probe can measure characteristics of the fluid flow without interfering with the fluid flow. That is, the optical probe can be installed into the surface of interest such that no portion of the optical probe extends into the fluid flow. In embodiments, the wall is non-planar, and the optical probe is configured to probe over the non-planar wall. The optical probe can be hermetically sealed within the wall. In embodiments, the optical probe can detect tracers (e.g., particles or fluorescent dyes). Such tracers can be inserted locally (e.g., via ports disposed upstream from the optical probe), dissolved uniformly in the flow, among other possibilities.

Figure 1:
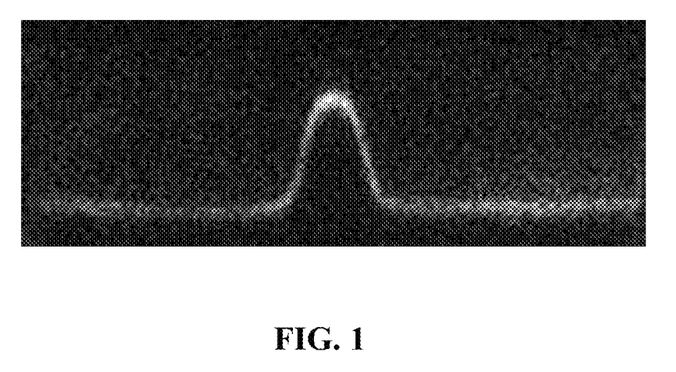
FIG. 1 shows example raw molecular tagging velocimetry data collected by an optical probe.

According to some aspects of this invention, the optical probe can measure wall shear stress using molecular tagging velocimetry (MTV). MTV can involve measuring velocity profiles of fluorescent, phosphorescent, or photochromic molecular dyes (i.e., tracers) within the fluid. FIG. 1 shows example raw data collected by the optical probe when the optical probe measures velocity profiles using MTV. When using MTV, the optical probe can include a light source (e.g., a laser, an LED, among other possibilities) that can selectively excite the molecular dye to create continuous patterns within the fluid, such as shown in FIG. 1. In embodiments, the optical probe can include a single light source or multiple light sources. The imager of the optical probe can capture the advection of the molecular dye and can record the velocity profiles and gradients directly. MTV can be implemented volumetrically with tomographic reconstruction algorithms.

Figure 2:
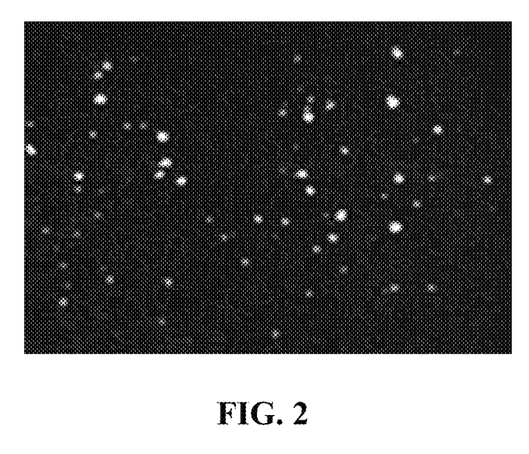
FIG. 2 shows example raw particle image velocimetry data collected by an optical probe.

According to some aspects of the invention, the optical probe can measure wall shear stress using particle image velocimetry (PIV) or particle tracking velocimetry (PTV). PIV and PTV are non-intrusive imaging techniques that can measure the velocity profiles of fluid flows. PIV and PTV can involve tracking particles (i.e., tracers) distributed within the fluid. The particles can be dissolved uniformly in the fluid or can be injected upstream of the optical probe. A light source (e.g., laser, LED, among other possibilities) can be used to illuminate a cross-section of the flow. The imager of the optical probe can record the Mie scattering signal of the particles. Alternatively, if fluorescent particles are used, the signal can be a fluorescent signal and spectral filters can be used to remove the illumination wavelength. In embodiments, multiple imagers can be deployed, and the velocity field can be reconstructed volumetrically with tomographic reconstruction algorithms. FIG. 2 shows raw shows example raw data collected by the optical probe when the optical probe measures velocity profiles using PIV. From the raw PIV data, discrete velocity vectors can be extracted. Velocity gradients can be reconstructed using interpolation schemes. Using correction factors, the wall shear stress can be inferred from the sparse velocity fields collected during the PIV or PTV measurements. Once the 3D scene is reconstructed, cross-correlation or pattern matching between sequentially reconstructed images permits accurate determination of the velocity field and gradients.

Since MTV, PIV, and PTV are each time-of-flight techniques, the velocity profiles of the fluid can be reconstructed using the following equation 2, where M is the magnification of the imager in mm/pixel (or mm/voxel), $\Delta x$ the pattern displacement in pixels (or voxels), and $\Delta t$ the time separation between images that are analyzed.

$$U = M \frac{\Delta x}{\Delta t} \quad (2)$$

The imager of the optical probe can be calibrated to control the magnification M and can include efficient algorithms to extract $\Delta x$ from collected images. At between images is optimized to reach a desirable $\Delta x$ for a given flow configuration and magnification M. Depending on the mode of the imager and signal to noise ratio, different algorithms can be used to reconstruct $\Delta x$. The algorithms can vary from cross-correlation between images, optical flow, curve fitting, peak finding, among other possibilities.

These and other aspects of the invention are described in greater details as follows in reference to FIGS. 3-8.

Figure 3:
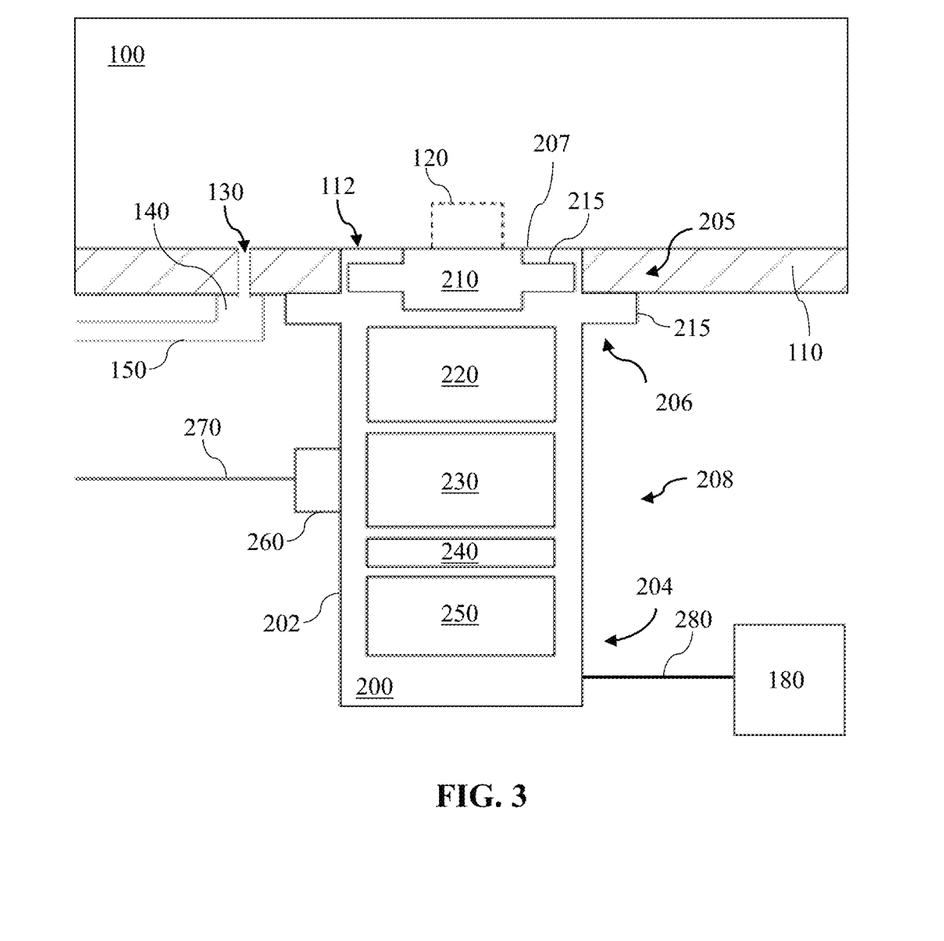
FIG. 3 shows a schematic view of an optical probe.

FIG. 3 shows a schematic view of an optical probe 200 according to some aspects of the invention. The optical probe 200 can be recessed within a wall 110 of an engineering system. The optical probe 200 can be recessed within the wall 110 such that no portion of the optical probe 200 projects into the flow path of a fluid domain 100 surrounding the wall 110. It should be noted that the term "fluid" is utilized here to include, for example, gases such as air; solutions or liquids such as water; multiphase flows, such bubbly flows, or solid dispersed in gases or liquids, gels, such as viscoelastic materials, polymers; or combinations thereof, among other possibilities. According to this configuration, the optical probe 200 can measure a characteristic of the fluid domain 100 (e.g., shear stress) through an opening 112 in the wall 110 without interfering with the fluid domain 100.

In the example embodiment shown, the probe 200 has a housing 202 with a proximal end portion 204, a distal end portion 206 having a distal end 207, and an intermediate portion 208 between the proximal end portion 204 and the distal end portion 206. The distal end portion 206 is received in the opening 112 of the wall 110. An enlarged widened section 215 forms a stop member that extends outward from the outer surface of the housing 202 to form a stop. The stop member is positioned inward from the distal end 207 so that the distal end 207 is substantially flush with the inner surface of the wall 110 when the stop member contacts an outer surface of the wall 110. And in some but not all embodiments, as shown, the distal end 207 faces substantially orthogonal to the direction of the fluid flow and extends substantially parallel to the direction of the fluid flow and the inner surface of the wall 110; and a longitudinal axis of the probe housing 202 extends substantially orthogonal to the housing 110 and the direction of the fluid flow. The proximal end 204 extends at the outer side of the wall 110.

The optical probe 200 can be mounted to the wall 110 at the opening 112 using a mounting system 205. The mounting system 205 can form a liquid-tight/gas-tight connection with the wall 110 such that no fluid within the fluid domain 100 can pass between the wall 110 and the optical probe 200. The mounting system 205 can include for example threads, flanges, gaskets, o-rings, thread sealant, silicone compounds, combinations thereof, among other possibilities. The mounting system 205 can be formed integrally with the probe 200, as shown by the stop member and distal end portion with external threads that mate with internal threads of the wall 110, or can be a discrete device that engages the probe 200.

The optical probe 200 can include a window or optical insert 210. The optical insert 210 can be a spectrally transparent component. The optical insert 210 can have a geometry that corresponds to the geometry of the wall 110. For example, in embodiments in which the wall 110 is planar the optical insert 210 can have a corresponding planar geometry. In embodiments in which the wall 110 is curved the optical insert 210 can have a curved geometry that corresponds to the curved geometry of the wall 110. According to this configuration, the optical insert 210 can allow the probe 200 to probe a region of interest 120 at the interface between the fluid domain 100 and the wall 110 without disturbing fluid flow within the fluid domain 100. In embodiments, the optical insert 210 can be a single integral component. In alternative embodiments, the optical insert 210 can be formed of a plurality of components some of which can be structural and others can be for curvature or refractive index correction. In the example embodiment of FIG. 3, the insert 210 has an outer surface that forms at least a portion of the distal end 207 of the probe housing 202.

The optical probe 200 can include an optical insert mounting 215. The optical insert mounting 215 can mount the optical insert within the housing of the optical probe 200 in a sealed manner. The optical insert mounting 215 can form a fluid-tight/gas-tight connection with the housing 202 of the optical probe 200 such that no fluid or gas within the fluid domain 100 can enter into the optical probe 200. According to this configuration, the optical insert 210 and the optical insert mounting 215 can together prevent fluid of the fluid domain 100 from entering the optical probe 200. The optical insert mounting 215 can include for example threads, flanges, gaskets, rings, thread sealant, silicone compounds, combinations thereof, among other possibilities. The optical insert mounting system 215 can be formed integrally with the optical insert 210, as shown by a widened section 215, or can be a discrete device that engages the probe 200. The optical insert 210 is mounted into the mounting system 215 through either a flanged connection, threaded inserts, compression fitting, of combination thereof, among other possibilities. The optical insert mounting 210 is mounted to the probe body 202 through external threads mate with internal threads inside the housing 202, a flange connection, a compression fit, or combination thereof, among other possibilities.

The optical probe 200 can include an objective 220 that can focus light received from the region of interest 120 through the optical insert 210. The objective 220 can be modular. In embodiments, the objective 220 can be a microscope objective. In embodiments, the objective 220 can be a camera lens. The objective 220 may include tube lens and relay lens systems. The objective 220 can include spectral filters, neutral density filters, polarizers, combinations thereof, among other possibilities, which can individually or together improve signal quality for subsequent processing.

The optical probe 200 can include a light guide 230 that can direct light from an external light source 270 to the region of interest 120. The external light 270 may go through the objective 220 and/or the optical insert 210. As described in greater detail later, the light guide 230 can be provided in a coaxial configuration with a dichroic mirror that can align the light source 270 and imager 250 of the optical probe 200. In alternative embodiments, the light guide 230 can be provided in an off-axis configuration that can include a mirror or prism disposed away from the optical axis of the imager 250 that can tilt light received from the light source 270 toward the region of interest 120.

The optical probe 200 can include a light guide, such as for example a micro-lens array 240 or other suitable component such as pinholes or diffractive elements. The micro-lens array 240 can direct light received from the region of interest 120 (for example, via the optical insert 210, objective 220, and light guide 230) to the imager 250 in a manner that allows for a three-dimensional reconstruction of the region of interest 120 with only a single imager 250.

The optical probe 200 can include the imager 250 that can collect views created from the cooperation of the objective 220 and the micro-lens array 240. In embodiments, the imager 250 can be a camera sensor. In embodiments, the imager 250 can include a charge coupled device array, a complementary metal oxide semiconductor array, a scientific complementary metal oxide semiconductor array, an intensified imager array, an electron multiplying charge coupled device, or combinations thereof, among other possibilities.

The optical probe 200 can include a coupling port 260. In embodiments, the coupling port 260 can couple the optical probe 200 to an external light source 270. In alternative embodiments, the light source can be integrated into the optical probe 200. The coupling port 260 can include fiber-optic coupling systems, a collimator that can collimate light sources, combinations thereof, among other possibilities.

In the example embodiment shown, the housing 202 is cylindrical (e.g., an elongated tube) with a circular cross-section, though any suitable shape can be utilized. The housing 202 can be solid or hollow. The housing holds all the components (including the insert 210, objective 220, guide 230, MLA 240 and imager 250) precisely in place and aligned with one another to transmit and receive the optical signal (light) from one component to the next. This can be accomplished by support elements and/or fastening devices, including for example, threaded inserts, spacer elements, support arms, shims, glued elements, or combination thereof, among other possibilities. In addition, one or more of those components can be formed integrally with one another, or as discrete elements that are either in direct contact or separated from each other by a distance or gap.

The optical probe 200 can be housed, and completely enclosed, within the housing 202. In embodiments, the optical probe 200 can be entirely contained within a single housing and that can accommodate planner and/or curved interfaces with the wall 110. In embodiments, the light source can be contained within the housing or coupled thereto.

The optical probe 200 can be a part of a larger system that can be used for calculating the shear stress within the region of interest 120. For example, the system can include an external light source 270. The external light source 270 can illuminate tracers within the fluid domain 100 as a part of calculating the shear stress. The light source 270 can include lasers, LEDs, combinations thereof, among other possibilities.

The system can include an injection apparatus or other various structures for injecting tracers into the fluid domain 100 for calculating the shear stress using, for example, MTV, PIV, and/or PTV techniques previously described. For example, the injection apparatus can include an injection tubing 150 that injects tracer through one or more injection ports 130 located upstream of the region of interest 120. The injection ports 130 can be configured to inject the tracers into the fluid domain 100. In embodiments, the injection ports 130 can include wall piercing tubes, slots, combinations thereof, among other possibilities. The injection ports 130 can be of a size sufficient to inject the tracers into the fluid domain 100 without significantly disturbing flow within the fluid domain 100. In embodiments, the system can include an injection plenum 140 that can distribute the tracers throughout the various injection ports 130. In embodiments, the system can include injection tubing 150 that can connect an external reservoir of tracers (not shown) to the injection plenum 140. The tracers can be pushed or pumped through the injection tubing 150, injection plenum 140, and/or the injection ports 130 via a pump or other like structure. These structures for injecting tracers into the fluid domain 100 can be entirely distinct from the optical probe 200 or entirely integrated into the optical probe 200. Some of the structures for injecting tracers into the fluid domain 100 can be distinct from the optical probe 200 while other of the structures for injecting tracers into the fluid domain 100 can be integrated into the optical probe 200.

Cabling 280 can be provided to power various structures of the optical probe 200. Cabling 280 can additionally or alternatively transmit data collected by the optical probe 200 and allow for synchronization triggering input and output to workstations that can be used to reconstruct the velocity profiles and wall shear stress of the region of interest 120. In alternative embodiments, power can be provided to the optical probe 200 via onboard power sources such as batteries or the like and/or data can be transmitted to and from the optical probe 200 wirelessly.

Thus, the various components are mechanically coupled to or within the housing and aligned with one another inside the probe housing 202, and with the region of interest 120, including the optical insert 210, objective 220, light guide 230, MLA 240, and imager 250. In operation, for example, light from an external light source 270 is received at the light guide 230. The light guide 230 directs the external light to the region of interest 120. The light from the external light source 270 may, in certain embodiments, go through the objective 220 and optical insert 210, but does not have to. The light exits the optical insert 210 and interacts with tracers 140 at the region of interest 120. The tracer 140 once illuminated either scatter the light, fluoresce, or phosphoresce, or combination thereof. This signal enters the distal end 207 of the probe 200 at the outer leading distal end of the optical insert 210. The insert 210 operates as a window or interface between the region of interest 120 and the light guide 230 and the objective 220, so that light can pass out from the light guide 230 through the insert 210 into the region of interest 120, and reflected or scattered light can re-enter through the insert 210 and pass to the objective 220. The insert 210 follows the curvature of the inner surface of the wall 110, here shown as linear, though other curvatures can be utilized. The light exits the optical insert 210 at a trailing proximal end of the optical insert 210, and is collected by the objective 220, which focuses the light. Light enters the objective 220 at a leading distal end of the objective 220 and exits through a trailing proximal end of the objective 220. In some but not all embodiments, the leading distal end of the objective 220 is substantially parallel to the trailing proximal end of the optical insert 210. Also in some but not all embodiments, light passes through the light guide 230, but does not have to.

The light is then received by the MLA 240, which creates perspective views. Light is received at a leading distal end of the MLA 240 and exits through a trailing proximal end of the MLA 240. In some but not all embodiments, the leading distal end of the MLA 240 is substantially parallel to the trailing proximal end of the objective 220. And finally, an image with multiple perspective views is formed at the imager 250, which detects and analyzes the tracer signal. The imager 250 has a line of sight, and the tracer signal is directed to the imager's line of sight via the optical insert 210, objective 220, light guide 230 and MLA 240. In some but not all embodiments, light enters at a leading distal end of the imager 250, which can be substantially parallel to the trailing proximal end of the MLA 240.

The system can include a processor 180 operatively connected to the optical probe 200 and can be, for example, a computer, controller or other processing device. The processor 180 can include software that automatically extracts wall shear stress from the images collected by the imager 250. The processor can transmit control signals to the imager 250 to control operation of the imager 250. The processor 180 also receives image data from the imager 250 and processes and analyzes the received image data to determine shear stress at the region of interest 120. The processor 180 can use any of the techniques previously described, such as MTV, or PIV. PTV, to determine the wall shear stress at the region of interest 120 from the images collected by the optical probe 200. The processor 180 can generate a three-dimensional image from the subsample, as previously described. The processor 180 can resolve near-wall velocity gradients at the region of interest 120, as previously described. The processor 180 can infer the wall shear stress from sparse velocity fields within the image. The processor 180 can resolve near-wall flow motion at spatiotemporal resolution. The processor 180 in electronic communication with the probe 200, and in particular the imager 250. Though the processor 180 is shown as discrete from the probe 200 and communicates by wired (via wire 280) or wireless communication, or fiber optics, or combination thereof, among other possibilities, in other embodiments it can be integral with the housing 202, such as an ASIC. The processor 180 can also control operation of the tracer 150 into the region of interest 120; for example, the amount of tracer, force of injection, and timing of the release.

Figure 4:
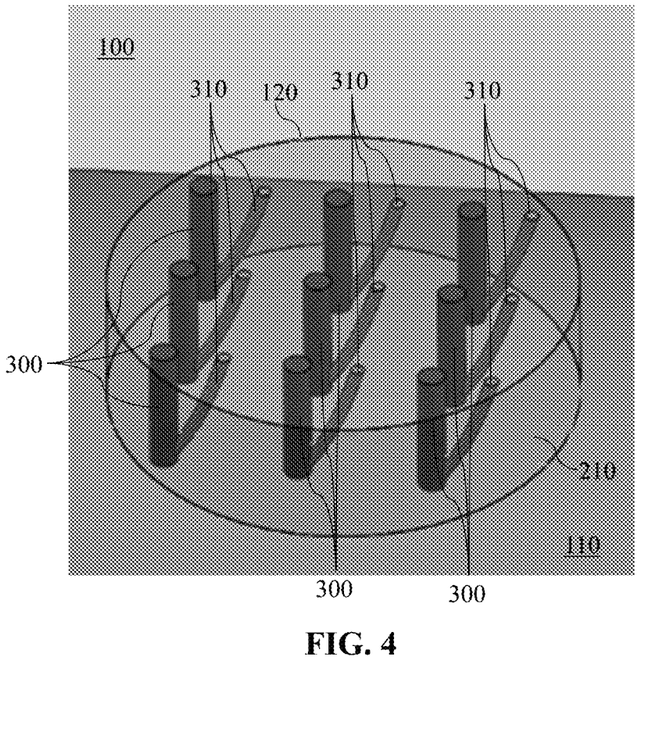
FIG. 4 shows a perspective view of the region of interest between a wall and a fluid domain.

FIG. 4 shows a perspective schematic view of the region of interest 120 between the wall 110 and the fluid domain 100. A plurality of initial patterns 300 are depicted within the region of interest 120. For MTV measurements, the initial patterns 300 are formed by fluorescent, phosphorescent, or photochromic molecular dyes and in embodiments can extend perpendicular to the wall 110. In alternative embodiments, the initial patterns 300 can extend in directions other than perpendicular to the wall 110. For PIV/PTV measurements, the initial patterns can be a series of randomly distributed particles. A plurality of deflected patterns 310 are also depicted within the region of interest 120. For MTV measurements, the deflected patterns 310 represent the effect of fluid flow on the initial pattern 300. For PIV/PTV measurements, discrete particles can be correlated to initial positions which can lead to discrete velocity vectors, from which velocity profiles can be extracted.

Figure 5:
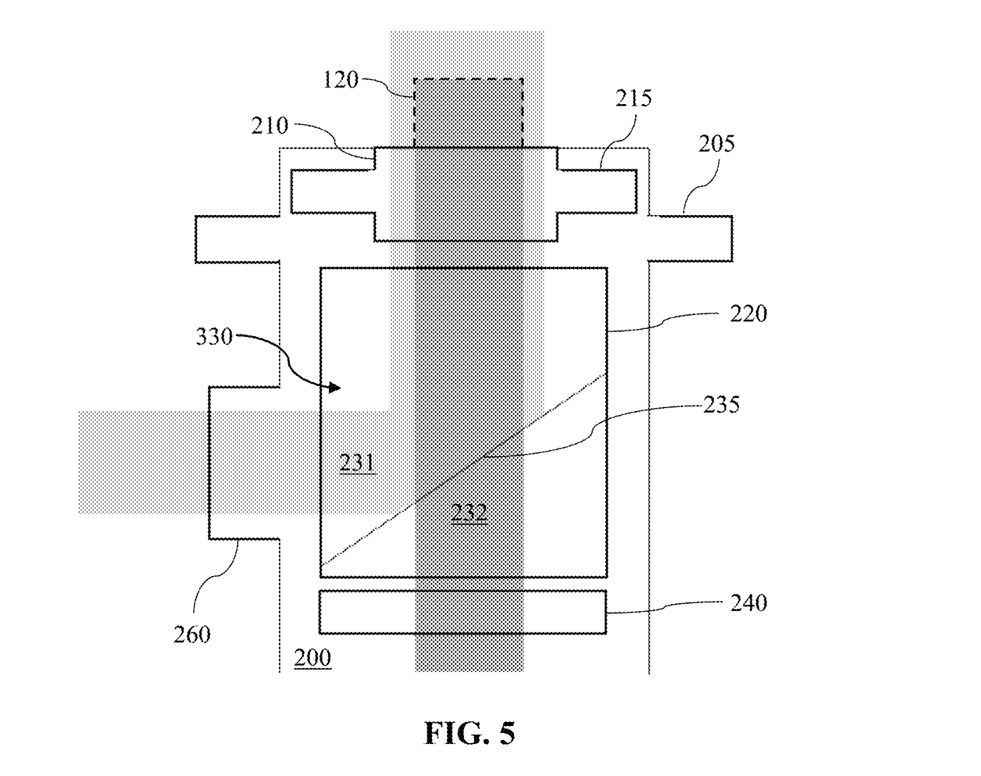
FIG. 5 shows a schematic view of a first embodiment of a light guide of the optical probe.
Figure 6:
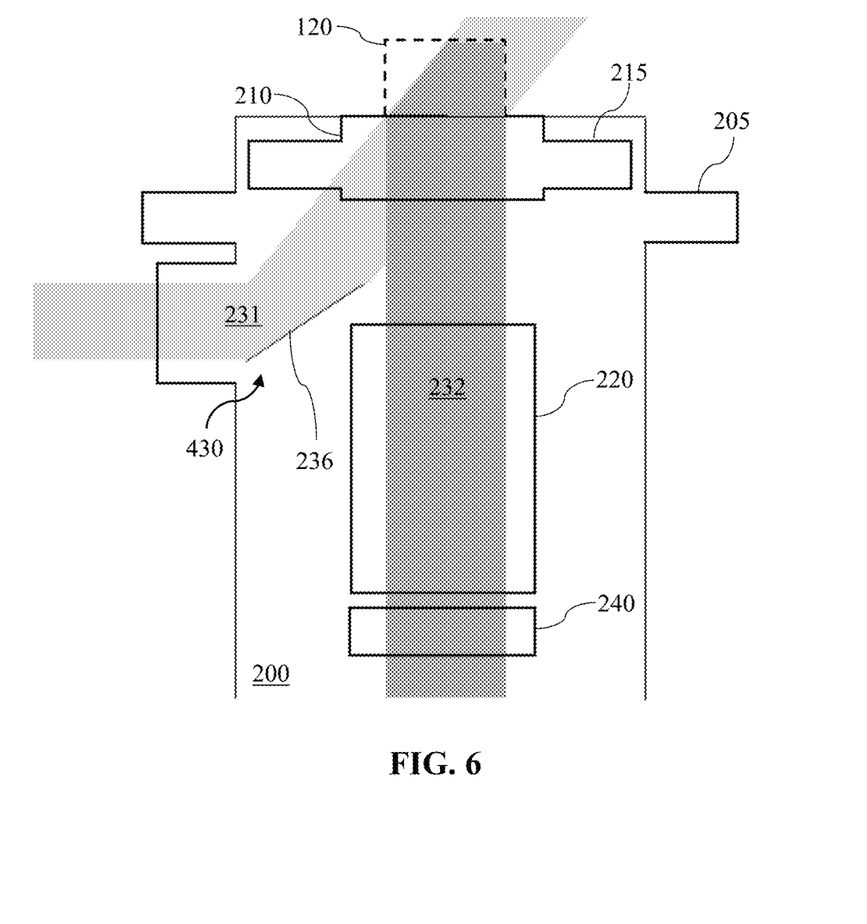
FIG. 6 shows a schematic view of a second embodiment of a light guide of the optical probe.
Figure 7:
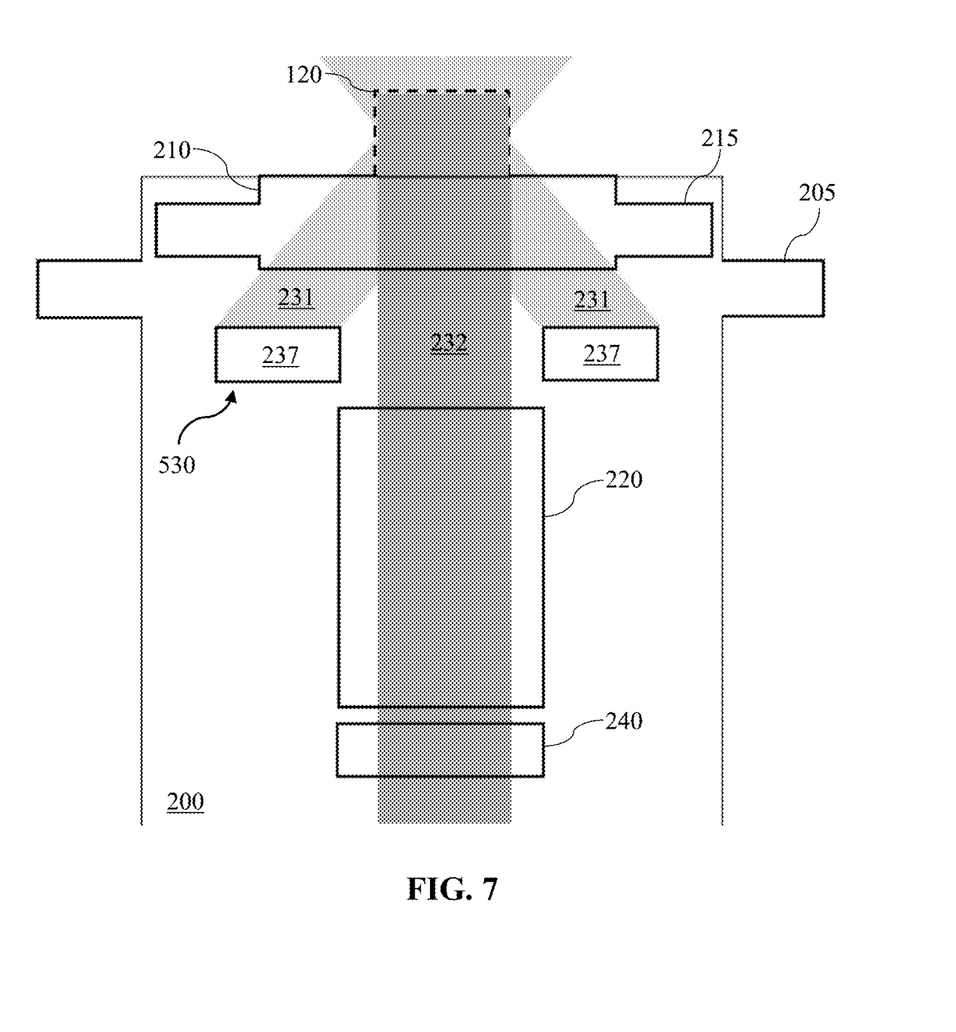
FIG. 7 shows a schematic view of a third embodiment of a light guide of the optical probe.

FIGS. 5-7 show schematic views of different embodiments of light guides of the optical probe 200. FIG. 5 shows a schematic view of a first embodiment of a light guide 330 of the optical probe 200. FIG. 6 shows a schematic view of a second embodiment of a light guide 430 of the optical probe 200. FIG. 7 shows a schematic view of a third embodiment of a light guide 530 of the optical probe 200. In each embodiment, illumination light 231 is directed at the region of interest 120 and an imaging signal 232 (i.e., light) is reflected back from the region of interest 120 through the optical probe 200 for processing. The illumination light 231 can be of a single wavelength, pulsed, laser light, LEDs light, combinations thereof among other possibilities. For MTV measurements, illumination light 231 can be supplied from one or two light sources depending on the MTV mode of operation. The imaging signal 232 can be fluorescence, phosphorescent, or photochromic signals (i.e., a different wavelength than the illumination light 231). For example, the imaging signal 232 can be an imaging scheme for MTV techniques or fluorescent particles for PIV techniques. Alternatively, the imaging signal 232 can be a resonant signal (i.e., the same wavelength as the illumination light 231).

The first embodiment of the light guide 330, shown in FIG. 5, can be a beam steering coaxial configuration. The light guide 330 can include a beam steering element 235. The beam steering element 235 can be aligned with the optical axis of the objective 220. The beam steering element 235 can reflect or refract the illumination light 231 towards the region of interest 120 while allowing the imaging signal 232 to pass. That is, the beam steering element 235 can reflect light from the light source (i.e., the illumination light 231) and direct the light to the region of interest without reflecting light of a wavelength from the region of interest (i.e., the imaging signal 232). The beam steering element 235 can be a dichroic or semi-reflective mirror, a polarizing beam splitter, among other possibilities. In embodiments, a dichroic mirror can be used for imaging in fluorescence mode (MTV or PIV with fluorescent particles). In alternative embodiments, a semi-reflective mirror can be used for imaging in brightfield or resonant mode, or a polarizing beam splitter can be used as well. The beam steering element 235 can be arranged within the objective 220 or between the optical insert 210 and the objective 220.

The second embodiment of the light guide 430, shown in FIG. 6, can involve beam steering in an off-axis configuration. The light guide 430 can include a beam steering element 236. The beam steering element 236 can be aligned off of the optical axis of the objective 220. The beam steering element 236 can direct light from the light source towards the region of interest 120 at an angle with respect to an optical axis of the objective 220. The beam steering element 236 can be provided within the housing of the optical probe 200 or outside of the housing of the optical probe 200. The beam steering element 236 can include a prism, a mirror, combinations thereof, among other possibilities. In embodiments, the beam steering element 236 can be axisymmetric, which may improve illumination efficiency.

The third embodiment of the light guide 530, shown in FIG. 7, can include one or more light sources 237 integrated into the optical probe 200, and for example can be located inside the housing 202. The light sources 237 can be provided directly within the housing of the optical probe 200. The light sources 237 can be aligned off of the optical axis of the objective 220. In embodiments, the light sources 237 can be provided in an annular configuration to provide axisymmetric illumination. In at least some embodiments in which the optical probe 200 includes a light guide 530, the coupling port 260 can be eliminated.

Figure 8:
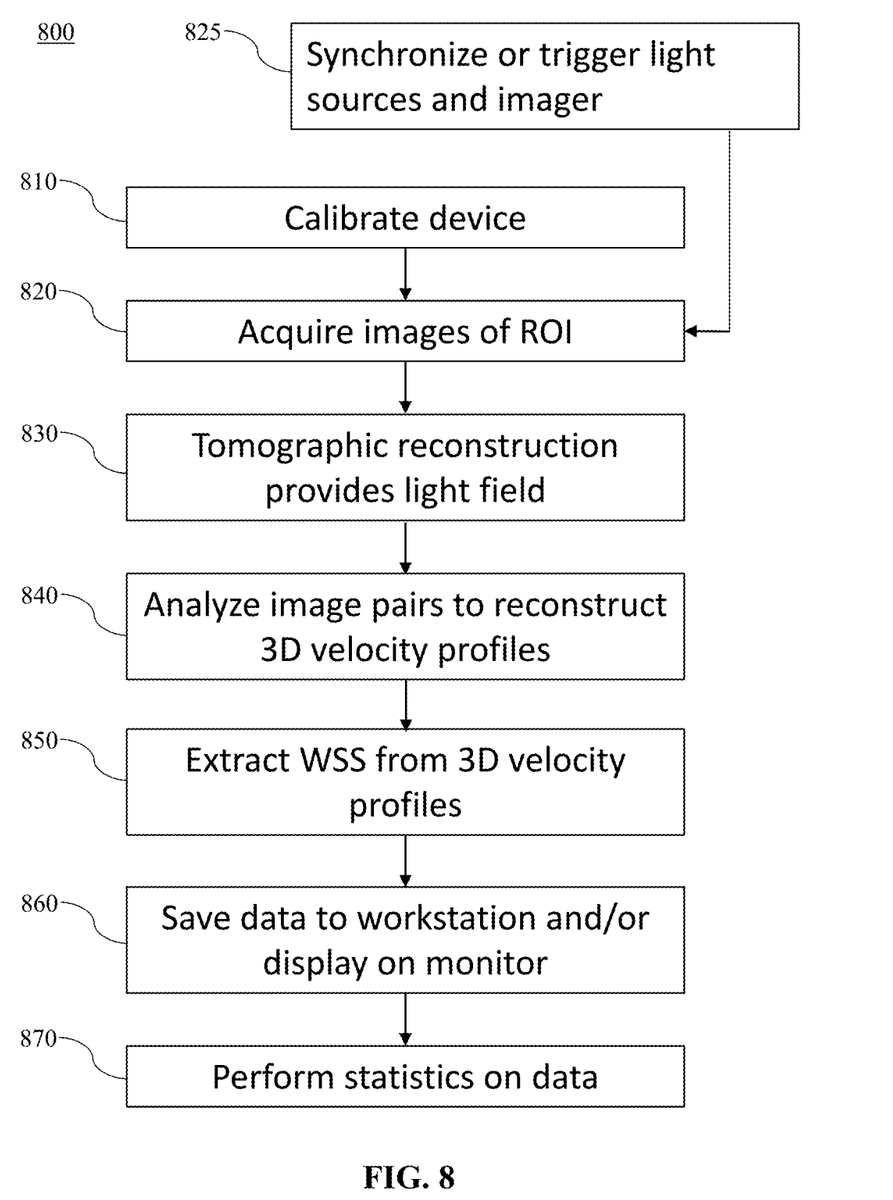
FIG. 8 shows a process of measuring wall shear stress using the optical probe.

FIG. 8 shows a process 800 of determining the wall shear stress at the region of interest. The process 800 can be performed using any of the embodiments of the optical probe 200 described previously. The process 800 can include, at step 810, calibrating the optical probe 200. Step 810 can be performed at a factory for a particular fluid domain 100 and optical insert 210. Step 810 can include determining the magnification of the imager M for use in equation 2, described previously. Since the geometry is fixed, the optical probe 200 will not need to be calibrated in the field after the calibrations performed at step 810. A simple calibration step (acquiring collimated light) can ensure that the optical probe 200 has maintained its physical integrity and is ready to perform within its specificity. However, if the optical probe 200 is modified (e.g., through modification of its internal geometry, use of different fluid domain 100, or optical insert 210, etc.) step 810 can be repeated.

The process 800 can include, at step 820, acquiring images of the region of interest 120. Once the optical probe 200 is inserted in the wall 110, images of the region of interest 120 in PIV or MTV modes can be acquired at step 820.

The process 800 can include, at step 825, synchronizing the imager 250 and the light sources of the optical probe 200. The imager 250 can be triggered externally to be synchronized with light sources or take short snapshots of the region of interest. Step 825 can control the $\Delta t$ in equation 2, described previously, for the velocity field reconstruction. A precise time source, such as pulse generator can make the uncertainty linked with $\Delta t$ negligible in the overall velocity reconstruction. Other synchronization protocols, such as TRIG-B protocol, can be used to synchronize or fuse data with other instruments.

The process 800 can include, at step 830, reconstructing the light field within the region of interest 120 from the perspective views enabled by the micro-lens array 240. The light field can be reconstructed at step 830 using tomographic algorithms.

The process 800 can include, at step 840, reconstructing three-dimensional velocity fields. The three-dimensional velocity fields can be reconstructed by subsequent light fields reconstructed at step 830 or from an initial light field with the light field of a deformed pattern. The pattern displacement $\Delta x$ from equation 2, described above, can be determined from step 840. Depending on the nature of the signal and its quality, algorithms vary from cross-correlation between images, optical flow, curve fitting, peak finding, among other possibilities.

The process 800 can include, at step 850, extracting the wall shear stress using the reconstructed three-dimensional velocity fields from step 840. The wall shear stress can be extracted from the three-dimensional velocity fields of step 840 by extrapolating velocity gradients at the wall 110, following equation 1 above.

The process 800 can include, at step 860, saving or displaying the wall shear stress extracted at step 850 at an external location such as for example workstation. Users can select to save raw imaging data (for subsequent reprocessing) or directly save the reconstructed light fields.

The process 800 can include, at step 870, performing statistics on the wall shear stress extracted at step 850 to extract moments of the washer stress, probability distribution function, intermittency, and/or any other values of interest.

It is noted that the drawings may illustrate, and the description and claims may use geometric or relational terms, such as circle, cylindrical, tube, elongated, aligned, outer, inner, surface, linear, curved, planar, orthogonal, flush, distal, proximal, etc. These terms are not intended to limit the disclosure and, in general, are used for convenience to facilitate the description based on the examples shown in the figures. In addition, the geometric or relational terms may not be exact. For instance, walls may not be exactly linear because of, for example, roughness of surfaces, tolerances allowed in manufacturing, etc., but may still be considered to be perpendicular or parallel.

It will be appreciated that the foregoing description provides examples of the invention. However, it is contemplated that other implementations of the invention may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

What is claimed is:

1. A system for measuring wall shear stress within a region of interest, the system comprising:
   an optical probe for collecting images of the region of interest, the optical probe comprising:
   an imager with a line of sight;
   a light guide configured to steer light from a light source to the region of interest;
   an objective configured to focus light reflected from the region of interest to the line of sight of the imager, wherein the imager is configured collect images from the light from the objective;
   a micro-lens array at the objective, the micro-lens array configured to focus light from the objective onto the imager, wherein the micro-lens array is configured to subsample the region of interest at different perspective angles; and a processor configured to determine wall shear stress at the region of interest from the images, and to generate a three-dimensional image from the subsample.

2. The system of claim 1, wherein the processor is configured to resolve near-wall velocity gradients at the region of interest.

3. The system of claim 1, wherein the processor is configured to determine wall shear stress at the region of interest from the images using molecular tagged velocimetry.

4. The system of claim 1, wherein the processor is configured to determine wall shear stress at the region of interest from the images using particle image velocimetry or particle tracking velocimetry.

5. The system of claim 1, further comprising tracers injected into fluid flowing through the region of interest.

6. The system of claim 1, wherein the processor is configured to infer the wall shear stress from sparse velocity fields within the image.

7. The system of claim 1, wherein the processor is configured to resolve near-wall flow motion at a desired spatio-temporal resolution.

* * * * *